US010728178B2

(12) United States Patent
Cheng (10) Patent No.: US 10,728,178 B2
(45) Date of Patent: Jul. 28, 2020

(54) APPARATUS AND METHOD FOR DISTRIBUTION OF CONGESTION INFORMATION IN A SWITCH

(71) Applicant: Intel Corporation, Santa Clara, CA (US)

(72) Inventor: Albert S. Cheng, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/776,661

(22) PCT Filed: Dec. 23, 2015

(86) PCT No.: PCT/US2015/000257
§ 371 (c)(1),
(2) Date: May 16, 2018

(87) PCT Pub. No.: WO2017/111780
PCT Pub. Date: Jun. 29, 2017

(65) Prior Publication Data
US 2018/0375801 A1 Dec. 27, 2018

(51) Int. Cl.
*H04L 12/931* (2013.01)
*H04L 12/801* (2013.01)

(52) U.S. Cl.
CPC .............. *H04L 49/50* (2013.01); *H04L 47/12* (2013.01)

(58) Field of Classification Search
CPC ...................................................... H04L 49/50
See application file for complete search history.

(56) References Cited

U.S. PATENT DOCUMENTS

| 4,665,518 A | * | 5/1987 | Champlin ............. H04L 12/433 370/222 |
| 8,184,626 B2 | | 5/2012 | Scott et al. |
| 2005/0108444 A1 | | 5/2005 | Flauaus et al. |
| 2011/0211582 A1 | | 9/2011 | Zhou et al. |
| 2012/0057467 A1 | | 3/2012 | Yoshida et al. |
| 2014/0219097 A1 | | 8/2014 | Gratz et al. |

FOREIGN PATENT DOCUMENTS

CN          102057360 A          5/2011

OTHER PUBLICATIONS

International Search Report and Written Opinion dated Aug. 24, 2016 for International Application No. PCT/US2015/000257, 13 pages.

* cited by examiner

*Primary Examiner* — John D Blanton
(74) *Attorney, Agent, or Firm* — Schwabe, Williamson & Wyatt, P.C.

(57) ABSTRACT

Apparatuses and methods associated with distributing congestion information in a switch are provided. In embodiments, the switch includes a plurality of ports arranged in a plurality of rows and a plurality of columns. The switch further includes a plurality of daisy-chain buses, individual daisy-chain buses coupling the ports of a respective row to one another in a daisy-chain. The switch further includes a plurality of column buses, individual column buses coupling an individual port of the plurality of ports to the other ports of the respective column. Individual ports of a respective row receive congestion information from the other ports of the row via the respective daisy-chain bus and pass the congestion information to the other ports of the respective column via the respective column bus. Other embodiments may be described and/or claimed.

18 Claims, 7 Drawing Sheets

APPARATUS AND METHOD FOR DISTRIBUTION OF CONGESTION INFORMATION IN A SWITCH

CROSS REFERENCE TO RELATED APPLICATIONS

The present application is a national phase entry under 35 U.S.C. § 371 of International Application No. PCT/US2015/000257, filed Dec. 23, 2015, entitled "APPARATUS AND METHOD FOR DISTRIBUTION OF CONGESTION INFORMATION IN A SWITCH", which designated, among the various States, the United States of America. The PCT/US2015/000257 Application is hereby incorporated by reference in its entirety.

TECHNICAL FIELD

The present disclosure relates to the field of networking. More particularly, the present disclosure relates to distributing congestion information in switches.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A switch typically includes a plurality of ports, with individual ports having an input port and an output port. An adaptive data packet received at an input port may be routed to one of a plurality of output ports. The selected output port may be determined based on congestion levels of the plurality of output ports.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses and methods associated with distributing congestion information in a switch are provided herein. In embodiments, the switch may include a plurality of ports arranged in a plurality of rows and a plurality of columns (e.g., in a tile-matrix configuration). The switch may further include a plurality of daisy-chain buses, wherein individual daisy-chain buses couple the ports of a respective row to one another in a daisy-chain. The switch may further include a plurality of column buses, wherein individual column buses couple an individual port of the plurality of ports to the other ports of the respective column. In various embodiments, individual ports of a respective row may receive congestion information from the other ports of the row via the respective daisy-chain bus and may pass the congestion information to the other ports of the respective column via the respective column bus. The described congestion information distribution scheme may provide an efficient mechanism (in terms of necessary transmission lines and latency) for each port of the switch to receive congestion information associated with all of the other ports of the switch.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
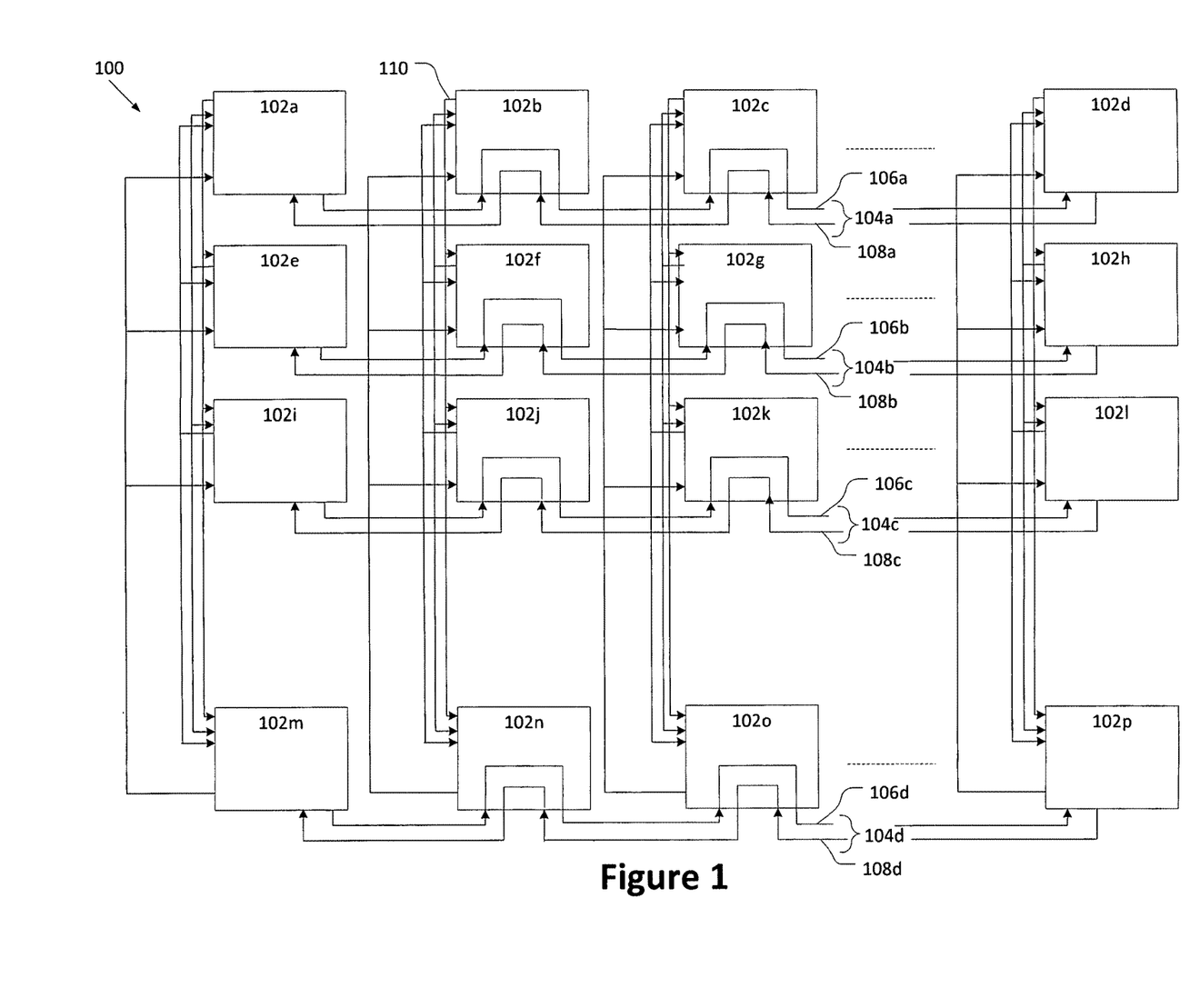
FIG. 1 illustrates a block diagram of a switch with the congestion information distribution technology of the present disclosure, in accordance with various embodiments.

FIG. 1 illustrates a switch 100 having the congestion information distribution technology of the present disclosure, in accordance with various embodiments. Switch 100 may include a plurality of ports 102a-p arranged in a plurality of rows and a plurality of columns as shown. Although 16 ports 102a-p are shown in FIG. 1, the switch 100 may include any suitable number of ports 102a-p. For example, in one embodiment, the switch 100 may include 64 ports 102a-p. The switch 100 may route data (e.g., data packets) received at an individual port 102a-p to one of the other ports 102a-p. In some embodiments, the switch may be capable of routing data from any of the ports 102a-p to any of the other ports 102a-p. Further, individual ports of a respective row may be configured to efficiently receive congestion information from the other ports of the row via a daisy-chain bus, and pass the congestion information to the other ports of the respective column, to be described more fully below.

In some embodiments, the switch 100 may be coupled to a plurality of nodes (e.g., processors (not shown)) and may be used to route data between the plurality of nodes. In some embodiments, a plurality of switches (e.g., switches 100) may be coupled to one another to form a fabric or network to route data between a plurality of processors. The plurality of switches of the fabric or network may be interconnected to provide multiple routing paths between two nodes/processors.

Figure 2:
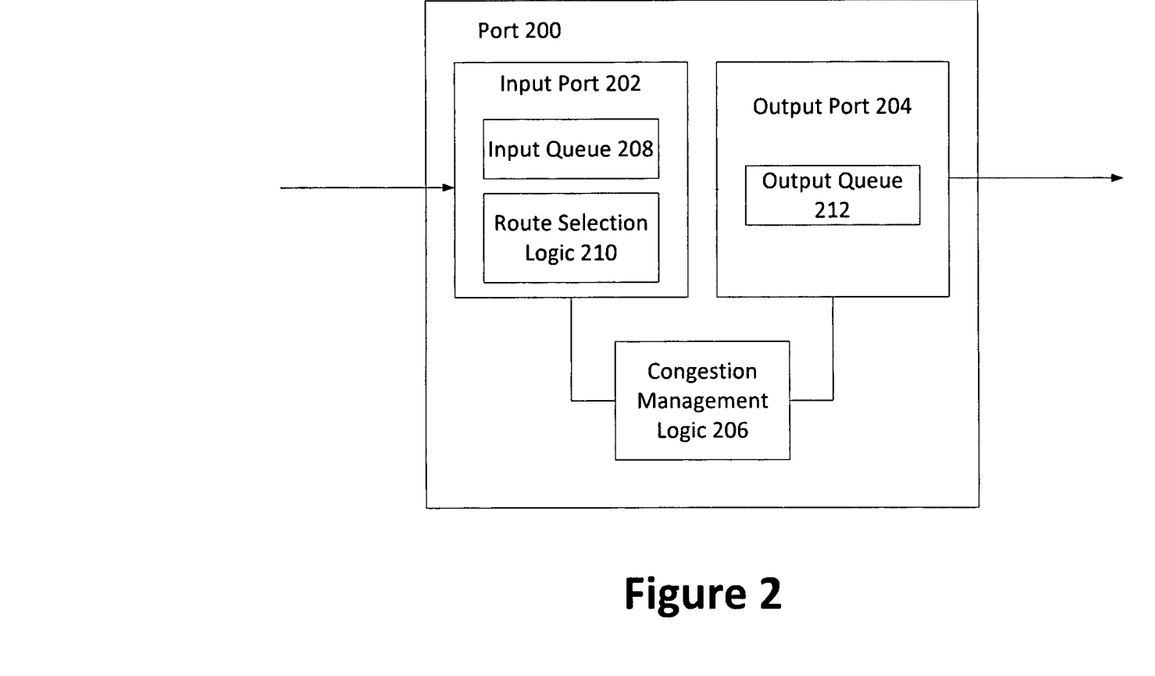
FIG. 2 illustrates a block diagram of a port of a switch with congestion management logic, in accordance with various embodiments.

FIG. 2 illustrates a port 200 in accordance with various embodiments. Port 200 may correspond to the ports 102a-p in various embodiments. Port 200 may include an input port 202, an output port 204, and congestion management logic 206. The input port 202 may include an input queue 208 and route selection logic 210. The output port 204 may include an output queue 212.

In various embodiments, the input port 202 of port 200 may receive an incoming data packet. The input port 202 may further receive a destination local identifier (DLID) associated with the data packet. The DLID may identify the destination node (e.g., one of the processors coupled to the fabric or network) to which the port 200 is to route the data packet. In some embodiments, the DLID may be included in the data packet (e.g., in a header of the data packet).

In various embodiments, the data packet may be an adaptive data packet that is to be adaptively routed by the switch 100. For adaptive data packets, a plurality of the output ports 204 of respective ports 102a-p may be usable to route the adaptive data packet to the destination node. The port 102a-p that receives the adaptive data packet may select a destination port 102a-p to which to route the adaptive data packet. Adaptive data packets are distinguished from deterministic data packets, for which the destination port to which to route the deterministic data packet is pre-determined and may not be altered by the switch 100. In embodiments, the data packet may include an indicator (e.g., a bit) to indicate whether the data packet is an adaptive data packet or a deterministic data packet.

In various embodiments, the port 200 may determine the destination port to which to route the adaptive data packet based on congestion information associated with the candidate destination ports. The congestion management logic 206 may receive congestion information that indicates respective congestion levels associated with the other ports of the switch. For example, the congestion level for a port 200 may be based on a congestion of the output port 204 and/or the output queue 212 (e.g., the number of data packets that are in the output queue awaiting output). The congestion management logic 206 may receive the congestion information, and/or distribute its own congestion information to other ports, according to the congestion information distribution scheme described herein.

In various embodiments, the route selection logic 210 may determine a set of candidate output ports that are usable to send the data packet to the destination node. The route selection logic 210 may select one of the candidate output ports as the destination port based on the congestion information associated with the candidate output ports. The input port 202 may buffer the data packet in the input queue 208 and send the data packet to the destination port. The data packet may be routed from the input port 202 to the destination port via data buses (not shown in FIG. 1 or FIG. 2) that couple the ports of the switch to one another. For example, the data buses may include row data buses that couple the ports of the same row to one another and column data buses that couple the ports of the same column to one another.

The destination port may receive the data packet and buffer the data packet in the output queue 208 of the destination port. The output port 204 of the destination port may output the data packet from the output queue 212 (e.g., to the destination node or another switch coupled between the switch 100 and the destination port).

Referring back to FIG. 1, in various embodiments, the switch 100 may include a plurality of daisy-chain buses 104a-d that couple the ports 102a-p of the same row to one another in a daisy chain. For example, daisy-chain bus 104a may couple the ports 102a-d to one another in a daisy chain. The daisy-chain buses 104a-d may be used to distribute congestion information for ports 102a-p of a row to the other ports 102a-p of the row. In some embodiments, the individual daisy-chain buses 104a-d may include a first directional bus 106a-d and a second directional bus 108a-d. The first directional bus 106a-d may carry congestion information in a first direction in the respective row, and the second directional bus 108a-d may carry congestion information in a second direction (opposite the first direction) in the respective row.

The switch 100 may further include a plurality of column buses 110. The individual column buses 110 may couple an individual port 102a-p to all the other ports 102a-p of the respective column. The column buses 110 may be "point-to-point" buses that directly couple the individual port 102a-p to each of the other ports 102a-p of the respective column (e.g., without being routed through another port). In some embodiments, the column buses 110 may include separate transmission lines to couple the individual port 102a-p to each of the other ports 102a-p of the respective column. In other embodiments, the column buses may be daisy-chain buses to couple the ports of a column to one another in a daisy chain, as further discussed below.

In various embodiments, the individual ports 102a-p of a respective row may receive congestion information from the other ports 102a-p of the row via the respective daisy-chain bus 104a-d, and may pass the congestion information for the row to the other ports of the respective column via the respective column bus 110. For example, port 102b may receive congestion information associated with the ports 102a, 102c, and 102d via the daisy-chain bus 104a. The port 102b may send the congestion information for ports 102a, 102b, 102c, and 102d to ports 102f, 102j, and 102n via the corresponding column bus 110.

In various embodiments, the first directional bus 106a-d, second directional bus 108a-d, and/or column bus 110 may each include a plurality of transmission lines to carry respective bits that indicate a congestion level of an associated port 102a-p. For example, in some embodiments, the congestion level of a port 102a-p may be represented by 4 bits and the first directional bus 106a-d, second directional bus 108a-d, and column bus 110 may include 4 congestion transmission lines to carry respective bits to indicate the congestion level. In other embodiments, the first directional bus 106a-d, second directional bus 108a-d, and/or column bus 110 may include greater or fewer than 4 congestion transmission lines. In some embodiments, one value indicated by the plurality of bits may indicate that the associated port 102a-p is in an error state and cannot be used as a destination port for outputting data.

In various embodiments, the first directional bus 106a-d, second directional bus 108a-d, and/or column bus 110 may further include a framing transmission line to carry a framing signal. The framing signal may include a periodic pulse to indicate a start of a transmission cycle (e.g., a row transmission cycle or a column transmission cycle).

In various embodiments, during a first clock cycle of the row transmission cycle, the first port in a row (e.g., port 102a) may pass congestion information on the first directional bus (e.g., first directional bus 106a) to the second port in the row (e.g., port 102b). The first port may also generate the framing pulse on the first directional bus during the first clock cycle. For the first port in the row, the first clock cycle may refer to the clock cycle in which the port inserts the framing pulse, and for ports other than the first port in the row, the first clock cycle may refer to the clock cycle in which the port receives the framing pulse.

The second port may pass the framing pulse and the congestion information for the first port to the third port in the row (e.g., port 102c) via the first directional bus. The second port may insert its own congestion information on the first directional bus during the second clock cycle, the third port may insert its congestion information on the first directional bus during the third clock cycle, and so on.

A similar process may occur on the second directional bus (e.g., second directional bus 108a) to pass congestion information in the second direction on the row. In this case, the last port of the row (e.g., port 102d) may generate the framing pulse for the second directional bus.

Figure 3:
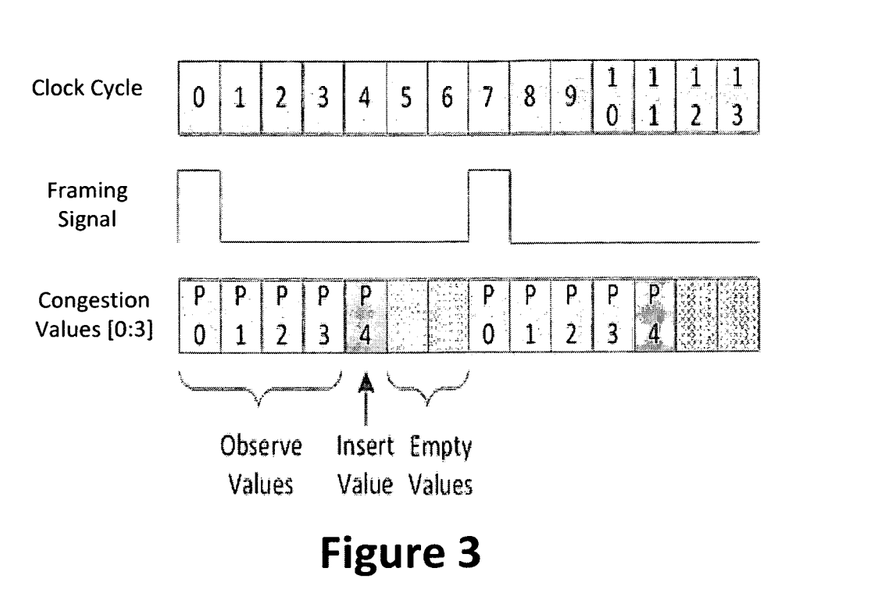
FIG. 3 illustrates example signals on a first directional bus of a switch, in accordance with various embodiments.
Figure 4:
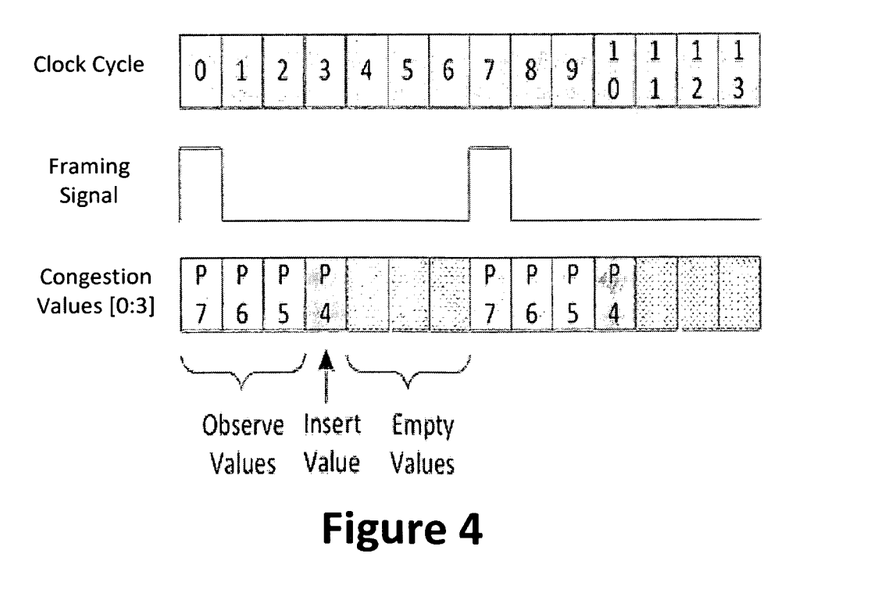
FIG. 4 illustrates example signals on a second directional bus of a switch, in accordance with various embodiments.

FIGS. 3 and 4 illustrate example signals on a first directional bus and a second directional bus, respectively, for a switch (e.g., switch 100) that includes 8 ports in a row (P0-P7). For example, ports P0-P7 may be ordered sequentially in the row, with P0 the leftmost port and P7 the rightmost port. The signals in FIGS. 3 and 4 are shown with reference to port P4. The ports P0-P7 may correspond to the ports of a row (e.g., ports 102a-d, ports 102e-h, ports 102i-1, and/or ports 102m-p) shown in FIG. 1.

Referring to FIG. 3, as shown, port P4 may receive the congestion levels of ports P0-P3 on the first directional bus during clock cycles 0-3, respectively. The port P4 may additionally receive the framing pulse during clock cycle 0. Port P4 may insert its own congestion level on the first directional bus during clock cycle 4. Clock cycles 5 and 6 may be empty values from the perspective of port P4.

The next transmission cycle may start at clock cycle 7. The framing pulse may be transmitted in clock cycle 7 to indicate the start of the next transmission cycle. Port P4 may receive updated congestion levels for ports P0-P3 in clock cycles 7-10, respectively. Port P4 may transmit its updated congestion level in clock cycle 11.

Referring to FIG. 4, as shown, port P4 may receive the congestion levels of ports P7, P6, and P5, on the second directional bus in clock cycles 0, 1, and 2, respectively. The port P4 may receive the framing pulse during clock cycle 0. Port P4 may insert its own congestion level on the second directional bus during clock cycle 3.

Figure 5:
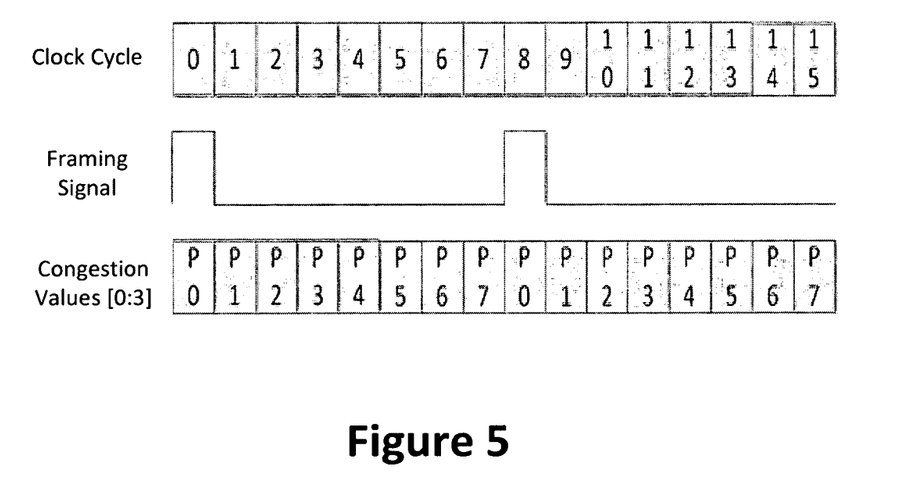
FIG. 5 illustrates example signals on a column bus of a switch, in accordance with various embodiments.

FIG. 5 illustrates example signals on a column bus for a switch (e.g., switch 100) that includes 8 ports in a row (P0-P7). The ports P0-P7 may correspond to the ports of a row (e.g., ports 102a-d, ports 102e-h, ports 102i-l, and/or ports 102m-p) shown in FIG. 1. The signals may be transmitted by a port to all the other ports of the respective column via a column bus. The column bus may include one of more congestion level transmission lines and a framing transmission line. The port may transmit, on the framing transmission line, a framing signal including a framing pulse (e.g., in clock cycle 0) to indicate the start of the transmission cycle. The port may transmit, on the one or more congestion level transmission lines, the congestion levels of each of the ports in the row (including its own transmission level) in respective clock cycles of the transmission cycle. Each port may receive similar transmissions from all of the other ports in its column to indicate the congestion levels of the ports of the respective columns. The transmissions from other ports in the column may be transmitted contemporaneously via separate transmission lines of the column bus.

For example, port 102c (corresponding to P2 of the row that includes ports 102a-d) may send the congestion level signals shown in FIG. 5 to the other ports in the column of port 102c (e.g., to ports 102g, 102k, and 102o) via the respective column bus 110 to indicate the congestion levels of ports 102a-d. Additionally, the port 102c may receive congestion level signals from port 102g to indicate the congestion levels of ports 102e-h, from port 102k to indicate the congestion levels of ports 102i-1, and from port 102o to indicate the congestion levels of ports 102m-p. The port 102c may receive the congestion level signals from port 102g, 102k, and 102o contemporaneously via separate transmission lines of the column bus 110. In this manner, port 102c may efficiently receive congestion information for the ports 102e-p of other rows.

Accordingly, for a switch with n columns (e.g., each row includes n ports), each port may receive updated congestion information for each port in its row every n−1 clock cycles and may receive updated congestion information for each port in other rows every n clock cycles. For example, for a switch with 8 columns, each port may receive updated congestion information for each port in its row every 7 clock cycles and may receive updated congestion information for each port in other rows every 8 clock cycles. In some embodiments, the switch may include the same number of rows as the number of columns. In other embodiments, the switch may include a different number of rows than the number of columns.

In various embodiments, the congestion information distribution scheme described herein may require fewer transmission lines than a distribution scheme that requires each port to be separately coupled with each other port, while still enabling each port to receive congestion information for each other port with low latency and high frequency. Furthermore, the congestion information distribution scheme described herein does not require a centralized congestion manager to collect information from each port and then broadcast it to all the other ports. Such a centralized congestion manager may require rearrangement of the ports from the row and column layout.

Although the embodiment of FIG. 5 was described with reference to a switch that includes point-to-point column buses, in other embodiments the column buses may include daisy chain buses that couple the ports of a column to one another in a daisy chain. The ports may send the congestion information for the respective row to other ports in the column using a similar technique as the technique described herein for sending congestion information to other ports of a row on the daisy-chain buses 104a-d. For example, the first port in a column may send the congestion information for all of the ports of the first row on the daisy-chain column bus. The congestion information for individual ports of the first row may be sent in sequential order, similar to the congestion level signals shown in FIG. 5. The first port may also generate and send a framing signal on the daisy-chain column bus. The second port in the column may pass the congestion information received from the first port in the column to the third port in the column via the daisy-chain column bus, and may then insert the congestion information for all of the ports in the second row. The use of daisy-chain column buses may require fewer transmission lines than point-to-point column buses, but may also increase the time period between updates of the congestion information for ports of other rows.

Figure 6:
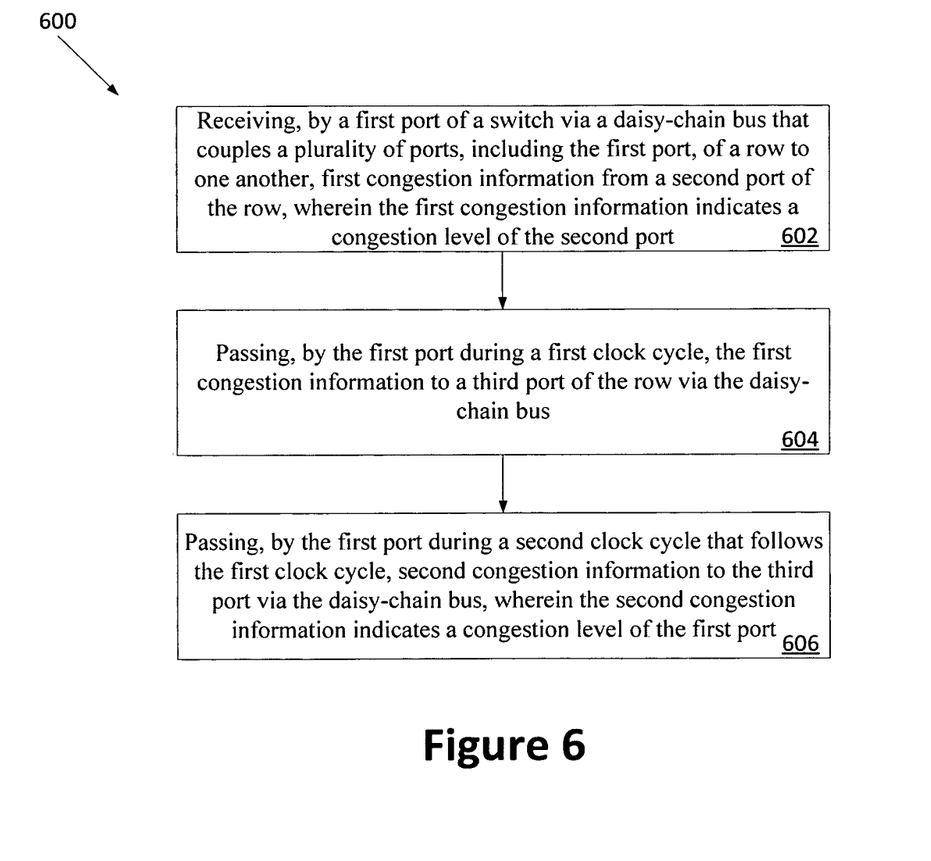
FIG. 6 illustrates a process for distributing congestion information in a switch, in accordance with various embodiments.

FIG. 6 illustrates a method 600 for distributing congestion information in a switch (e.g., switch 100) in accordance with various embodiments. The method 600 may be performed by a first port (e.g., port 102a-p and/or port 200) of the switch. The first port may not be the first port in the row. For example, the first port may be coupled between a second port and a third port on the row. In some embodiments, the first port may include or have access to one or more non-transitory computer-readable media having instructions, stored thereon, that when executed cause the first port to perform the method 600.

At block 602, the method 600 may include receiving, by the first port via a daisy-chain bus that couples a plurality of ports, including the first port, of a row to one another, first congestion information from a second port of the row, wherein the first congestion information indicates a congestion level of the second port. For example, the congestion information may include a plurality of bits on respective transmission lines to indicate the congestion level of the second port. In some embodiments, the first congestion information may be received on a directional bus (e.g., first or second directional bus) of the daisy-chain bus.

At block 604, the method 600 may include passing, by the first port during a first clock cycle, the first congestion information to a third port of the row via the daisy-chain bus.

At block 606, the method 600 may include passing, by the first port during a second clock cycle that follows the first clock cycle, second congestion information to the third port via the daisy-chain bus, wherein the second congestion information indicates a congestion level of the first port.

In some embodiments, the first port may receive congestion information from all of the other ports of the row via the daisy-chain bus (e.g., via first and/or second directional buses of the daisy-chain bus), and the method 600 may further include sending, by the first port, the congestion information for all the other ports of the row to all other ports of a column of the switch to which the first port belongs.

While the congestion distribution techniques are described herein with reference to a port receiving congestion information for other ports of a row and then sending the congestion information to other ports of a column, it will be apparent that the orientation of rows and columns may be transposed so that a port receives congestion information for other ports of a column and then distributes the congestion information to other ports of a row. Accordingly, the terms "row" and "column" are not meant to be limiting to a horizontal orientation and a vertical orientation, respectively. Rather, rows and columns refer to arrangements of series of ports that are generally orthogonal to one another.

Furthermore, while the distribution techniques of the present disclosure are described with reference to distribution of congestion information, it will be apparent that the techniques may be used to distribute any suitable type of port information associated with individual ports to other ports of a switch.

Figure 7:
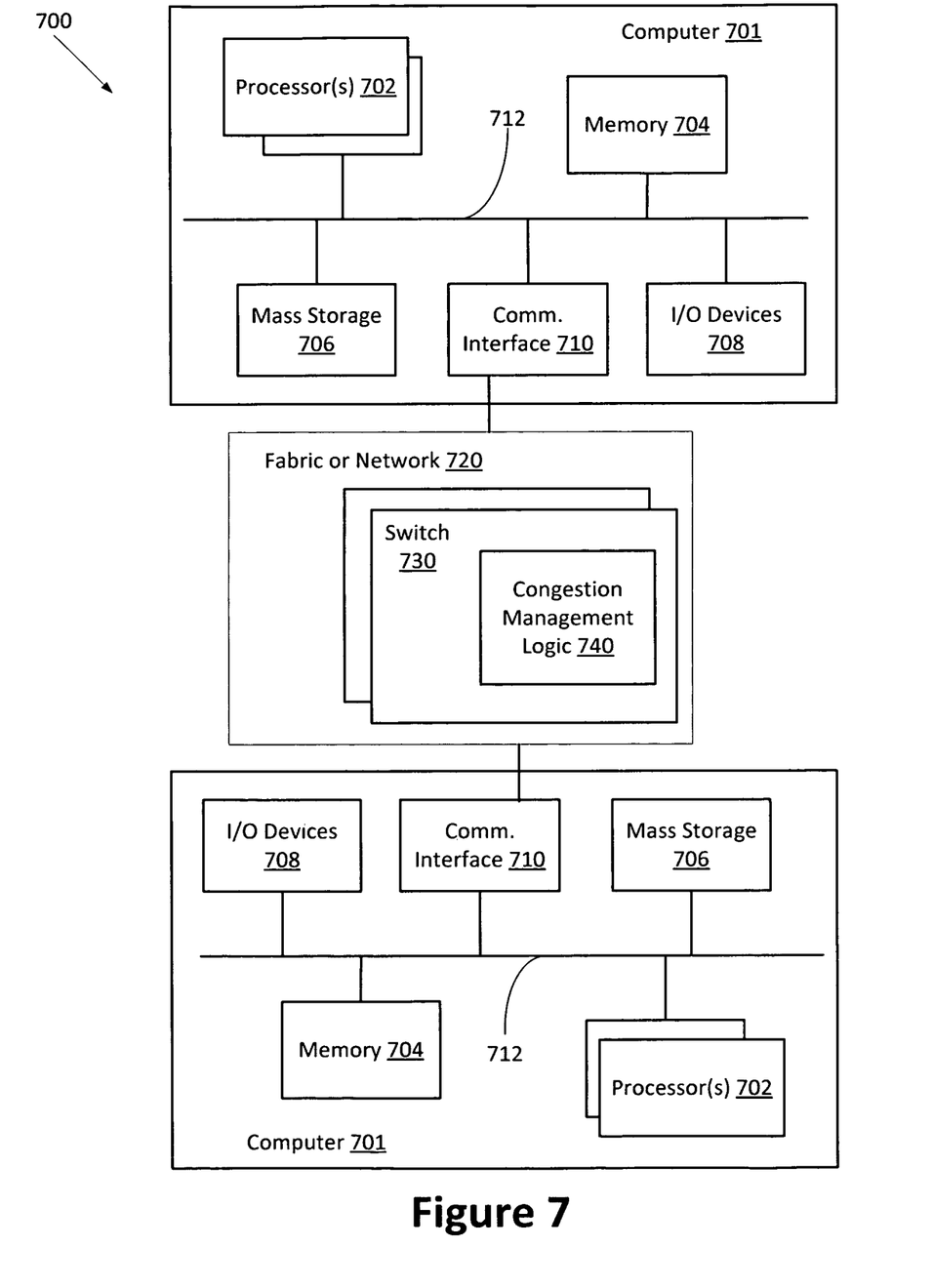
FIG. 7 illustrates an example computing system suitable for use to practice various aspects of the present disclosure, in accordance with various embodiments.

FIG. 7 illustrates an example computing system 700 (hereinafter "system 700") that may be suitable for use to practice selected aspects of the present disclosure. As shown, system 700 may include a plurality of computers 701, and a fabric or network 720 coupled to the computers. The fabric or network 720 may include a plurality of switches 730 coupled to one another to route data between the computers 701 (e.g., between the processors 702 of the computers 701). One or more of the switches 730 may correspond to the switch 100 described herein and/or may perform the method 600 described herein.

The computers 701 may be coupled to a plurality of the switches 730 to provide multiple routing paths between two computers 701. Although only two computers 701 are shown in FIG. 7, it will be appreciated that the fabric or network 720 and/or switches 730 may be used to route data between any suitable number of computers 701, including more than two computers 701. Each switch 730 may include congestion management logic 740 to perform one or more aspects of the congestion information distribution process described herein. In some embodiments, the congestion management logic 740 may be included in individual ports of the switch 730 as earlier described.

In some embodiments, the switch 730 may be coupled to the communication interfaces 710 of the computers 701. Alternatively, or additionally, the switch 730 may be coupled to a plurality of processors 702 of a single computer 701 to route data between the processors 702. In some embodiments, the switch 730 may be included in a same package with one or more processors (e.g., in a system-on-chip (SoC)).

The individual computers 701 may include one or more processors or processor cores 702, and system memory 704. For the purpose of this application, including the claims, the terms "processor" and "processor cores" may be considered synonymous, unless the context clearly requires otherwise. Additionally, computer 701 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown). Each of these elements may perform its conventional functions known in the art. In some embodiments, the computers 701 may be stationary devices, mobile devices, or servers.

Figure 8:
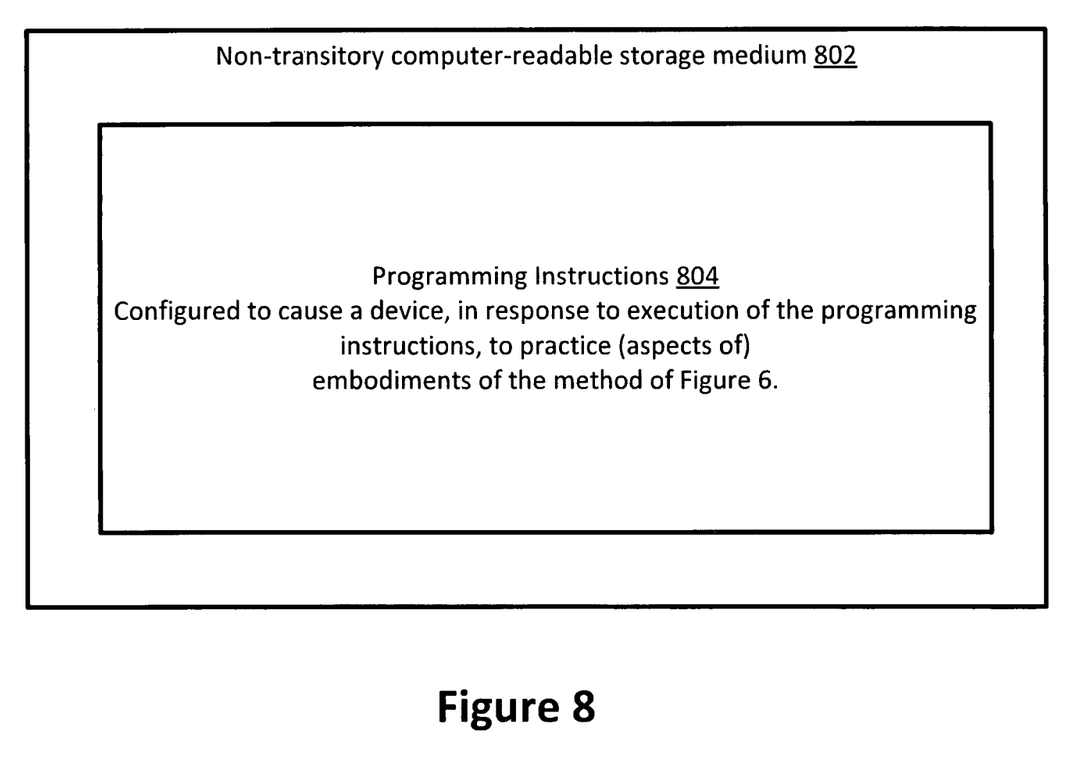
FIG. 8 illustrates a computer readable medium suitable for use to practice various aspects of the present disclosure, in accordance with various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., switch 100 or switch 730, in response to execution of the programming instructions, to perform the congestion information distribution process described herein (e.g., the congestion information distribution process described with respect to FIGS. 1-5 or the method 600 of FIG. 6). In alternate embodiments, programming instructions 804 may be disposed on multiple computer-readable non-transitory storage media 802 instead. In alternate embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Some non-limiting Examples of various embodiments are provided below.

Example 1 is a switch comprising: a plurality of ports arranged in a plurality of rows and a plurality of columns; a plurality of daisy-chain buses, wherein individual daisy-chain buses couple the ports of a respective row to one another in a daisy-chain; and a plurality of column buses, wherein individual column buses couple an individual port of the plurality of ports to other ports of the respective column; wherein the individual ports of a respective row are to receive congestion information associated with the other ports of the row via the respective daisy-chain bus and pass the congestion information associated with the other ports of the row to the other ports of the respective columns via the respective column bus.

Example 2 is the switch of Example 1, wherein the column buses include separate transmission lines to couple the individual port of the plurality of ports to each of the other ports of the respective column.

Example 3 is the switch of Example 1, wherein a first port of a first row of the plurality of rows is to: receive first congestion information from a second port of the first row via a first daisy-chain bus of the plurality of daisy-chain buses, the first congestion information to indicate a congestion level of the second port; and pass second congestion information to a third port of the first row via the first daisy-chain bus, the second congestion information including the first congestion information and congestion information to indicate a congestion level of the first port.

Example 4 is the switch of Example 3, wherein the first congestion information includes a first plurality of bits on respective transmission lines of the daisy-chain bus to indicate the congestion level of the second port, and wherein, to pass the second congestion information to the third port, the first port is to: pass, during a first clock cycle, the first plurality of bits to the third port on the respective transmission lines; and pass, during a second clock cycle after the first clock cycle, a second plurality of bits to the third port on the respective transmission lines, the second plurality of bits to indicate the congestion level of the first port.

Example 5 is the switch of Example 4, wherein the daisy-chain bus further includes a framing transmission line to pass a framing signal to the ports of the first row.

Example 6 is the switch of Example 4, wherein the first plurality of bits is 4 bits.

Example 7 is the switch of any one of Examples 1 to 6, wherein individual ports include an output port and an input port. The input port includes route selection logic to: receive a data packet having a destination local identifier (DLID) to indicate a destination for the data packet; determine a plurality of candidate output ports associated with other ports of the switch by which the data packet can reach the destination; and select a destination output port from the plurality of candidate output ports based on congestion information received from the candidate output ports.

Example 8 is the switch of any one of Examples 1 to 6, wherein individual daisy-chain buses of the plurality of daisy-chain buses include a first directional bus to pass congestion information in a first direction in the respective row and a second directional bus to pass congestion information in a second direction in the respective row.

Example 9 is the switch of any one of Examples 1 to 6, wherein the plurality of columns consists of n columns, and wherein individual ports are to receive updated congestion information for another port of a same row every n−1 clock cycles and are to receive updated congestion information for another port of a same column every n clock cycles.

Example 10 is the switch of Example 1, wherein the column buses include daisy-chain buses to couple ports of a column in a daisy chain.

Example 11 is a method for distributing congestion information in a switch, the method comprising: receiving, by a first port of the switch via a daisy-chain bus that couples a plurality of ports, including the first port, of a row to one another, first congestion information from a second port of the row, wherein the first congestion information indicates a congestion level of the second port; passing, by the first port during a first clock cycle, the first congestion information to a third port of the row via the daisy-chain bus; and passing, by the first port during a second clock cycle that follows the first clock cycle, second congestion information to the third port via the daisy-chain bus, wherein the second congestion information indicates a congestion level of the first port.

Example 12 is the method of Example 11, wherein the receiving the first congestion information from the second port includes receiving the first congestion information via a first directional bus of the daisy-chain bus, and wherein the method further includes: receiving, by the first port via a second directional bus of the daisy-chain bus, third congestion information from the third port that indicates a congestion level of the third port; passing, by the first port during a third clock cycle, the third congestion information to the second port via the second directional bus; and passing, by the first port during a fourth clock cycle that follows the third clock cycle, the second congestion information to the second port via the second directional bus.

Example 13 is the method of Example 11, wherein the receiving congestion information from the second port includes receiving a plurality of bits on respective transmission lines of the daisy-chain bus, wherein the plurality of bits indicate the congestion level of the second port.

Example 14 is the method of Example 13, wherein the second port is on an end of the row, and wherein the method further comprises generating; by the second port, a framing signal on a framing transmission line of the daisy-chain bus to indicate a start of a transmission cycle.

Example 15 is the method of Example 11, wherein the receiving the first congestion information from the second port further includes receiving, by the first port via the daisy-chain bus, congestion information from all other ports of the row; and sending, by the first port, the congestion information from all other ports of the row to all other ports of a column of the switch to which the first port belongs.

Example 16 is the method of Example 15, wherein the sending the congestion information from all other ports of the row to all other ports of the column includes sending the congestion information from all other ports of the row to all other ports of the column via separate transmission lines that couple the first port to individual ports of the other ports of the column.

Example 17 is a computing system comprising: a plurality of processors; and a switch coupled to the plurality of processors to route data between the plurality of processors. The switch comprises: a plurality of ports arranged in a plurality of rows and a plurality of columns, including a first port in a first row and a first column; a plurality of daisy-chain buses that couple the ports of a respective row of the plurality of rows to one another, wherein individual daisy-chain buses include a first direction bus and a second directional bus; and a plurality of column buses, wherein individual column buses couple an individual port of the plurality of ports to the other ports of the respective column; wherein the first port is to: receive, via the first directional bus of the first row, first congestion information associated with other ports of the first row that are disposed in a first direction from the first port from a second port that is adjacent the first port in the first direction; and receive, via the second directional bus of the first row, second congestion information associated with other ports of the first row that are disposed in a second direction from the first port from a third port that is adjacent the first port in the second direction.

Example 18 is the system of Example 17, wherein the first port is to pass the first congestion information, the second congestion information, and third congestion information associated with the first port to other ports of the first column via the column bus of the first column.

Example 19 is the system of Example 18, wherein the column bus includes a plurality of point-to-point transmission lines to pass the first congestion information, the second congestion information, and the third congestion information to respective other ports of the first column.

Example 20 is the system of Example 17, wherein the first port is to pass the first congestion information and third congestion information associated with the first port to the third port via the first directional bus of the first row.

Example 21 is the system of Example 20, wherein the first congestion information includes a first plurality of bits on respective transmission lines of the first directional bus to indicate a congestion level of the second port, wherein the third congestion information includes a second plurality of bits to indicate a congestion level of the first port, and wherein, to pass the first congestion information and the third congestion information to the third port, the first port is to: pass, during a first clock cycle, the first plurality of bits to the third port on the respective transmission lines of the first directional bus; and pass, during a second clock cycle that follows the first clock cycle, the second plurality of bits to the third port on the respective transmission lines.

Example 22 is the system of Example 21, wherein the first plurality of bits is 4 bits.

Example 23 is the system of Example 17, wherein the switch includes 64 ports. Example 24 is the system of any one of Examples 17 to 23, further comprising a fabric or network that includes the switch coupled with a plurality of other switches to route data between the plurality of processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A switch comprising:
   a plurality of ports arranged in a plurality of rows and a plurality of columns;
   a plurality of daisy-chain buses, wherein individual daisy-chain buses couple the ports of a respective row to one another in a daisy-chain; and
   a plurality of column buses, wherein individual column buses couple an individual port of the plurality of ports to other ports of the respective column, wherein the column buses include separate transmission lines to couple the individual port of the plurality of ports to each of the other ports of the respective column;
   wherein the individual ports of a respective row are to sequentially provide congestion information associated with the respective ports to other ports of the row via the respective daisy-chain bus and pass the congestion information associated with all the other ports of the row contemporaneously to the other ports of the respective columns via the separate transmission lines of the respective column bus.

2. The switch of claim 1, wherein a first port of a first row of the plurality of rows is to:
   receive first congestion information from a second port of the first row via a first daisy-chain bus of the plurality of daisy-chain buses, the first congestion information to indicate a congestion level of the second port; and
   pass second congestion information to a third port of the first row via the first daisy-chain bus, the second congestion information including the first congestion information and congestion information to indicate a congestion level of the first port.

3. The switch of claim 2, wherein the first congestion information includes a first plurality of bits on respective transmission lines of the daisy-chain bus to indicate the congestion level of the second port, and wherein, to pass the second congestion information to the third port, the first port is to:
   pass, during a first clock cycle, the first plurality of bits to the third port on the respective transmission lines; and
   pass, during a second clock cycle after the first clock cycle, a second plurality of bits to the third port on the respective transmission lines, the second plurality of bits to indicate the congestion level of the first port.

4. The switch of claim 3, wherein the daisy-chain bus further includes a framing transmission line to pass a framing signal to the ports of the first row.

5. The switch of claim 3, wherein the first plurality of bits is 4 bits.

6. The switch of claim 1, wherein individual ports include:
   an output port; and
   an input port including route selection logic to:
      receive a data packet having a destination local identifier (DLID) to indicate a destination for the data packet;
      determine a plurality of candidate output ports associated with other ports of the switch by which the data packet can reach the destination; and select a destination output port from the plurality of candidate output ports based on congestion information received from the candidate output ports.

7. The switch of claim 1, wherein individual daisy-chain buses of the plurality of daisy-chain buses include a first directional bus to pass congestion information in a first direction in the respective row and a second directional bus to pass congestion information in a second direction in the respective row, wherein the first and second directional buses are to pass the respective congestion information contemporaneously.

8. The switch of claim 1, wherein the plurality of columns consists of n columns, and wherein individual ports are to receive updated congestion information associated with another port of a same row every n–1 clock cycles and are to receive updated congestion information associated with another port of a same column every n clock cycles.

9. A method for distributing congestion information in a switch, the method comprising:
receiving, by a first port of the switch via a daisy-chain bus that couples a plurality of ports, including the first port, of a row to one another, first congestion information from a second port of the row, wherein the first congestion information indicates a congestion level of the second port;
passing, by the first port during a first clock cycle, the first congestion information to a third port of the row via the daisy-chain bus;
passing, by the first port during a second clock cycle that follows the first clock cycle, second congestion information to the third port via the daisy-chain bus to sequentially provide the third port with congestion information of all ports of the row, wherein the second congestion information indicates a congestion level of the first port;
receiving, by the first port via the daisy-chain bus, congestion information from all other ports of the row; and
sending, by the first port, the congestion information from all other ports of the row to all other ports of a column of the switch to which the first port belongs, wherein the congestion information from all other ports of the row is sent contemporaneously to all other ports of the column via separate transmission lines that couple the first port to individual ports of the other ports of the column.

10. The method of claim 9, wherein the receiving the first congestion information from the second port includes receiving the first congestion information via a first directional bus of the daisy-chain bus, and wherein the method further includes:
receiving, by the first port via a second directional bus of the daisy-chain bus, third congestion information from the third port that indicates a congestion level of the third port;
passing, by the first port during a third clock cycle, the third congestion information to the second port via the second directional bus; and
passing, by the first port during a fourth clock cycle that follows the third clock cycle, the second congestion information to the second port via the second directional bus.

11. The method of claim 9, wherein the receiving congestion information from the second port includes receiving a plurality of bits on respective transmission lines of the daisy-chain bus, wherein the plurality of bits indicate the congestion level of the second port.

12. The method of claim 11, wherein the second port is on an end of the row, and wherein the method further comprises generating, by the second port, a framing signal on a framing transmission line of the daisy-chain bus to indicate a start of a transmission cycle.

13. A computing system comprising:
a plurality of processors; and
a switch coupled to the plurality of processors to route data between the plurality of processors, the switch comprising:
a plurality of ports arranged in a plurality of rows and a plurality of columns, including a first port in a first row and a first column;
a plurality of daisy-chain buses that couple the ports of a respective row of the plurality of rows to one another, wherein individual daisy-chain buses include a first direction bus and a second directional bus; and
a plurality of column buses, wherein individual column buses include a plurality of point-to-point transmission lines to couple an individual port of the plurality of ports to respective other individual ports of the respective column; wherein the first port is to:
sequentially receive, via the first directional bus of the first row, first congestion information associated with other ports of the first row that are disposed in a first direction from the first port from a second port that is adjacent the first port in the first direction; and
sequentially receive, via the second directional bus of the first row, second congestion information associated with other ports of the first row that are disposed in a second direction from the first port from a third port that is adjacent the first port in the second direction; and
pass the first congestion information, the second congestion information, and third congestion information associated with the first port to the other individual ports of the first column contemporaneously via the respective point-to-point transmission lines of the column bus associated with the first column.

14. The system of claim 13, wherein the first port is to pass the first congestion information and third congestion information associated with the first port to the third port via the first directional bus of the first row.

15. The system of claim 14, wherein the first congestion information includes a first plurality of bits on respective transmission lines of the first directional bus to indicate a congestion level of the second port, wherein the third congestion information includes a second plurality of bits to indicate a congestion level of the first port, and wherein, to pass the first congestion information and the third congestion information to the third port, the first port is to:
pass, during a first clock cycle, the first plurality of bits to the third port on the respective transmission lines of the first directional bus; and
pass, during a second clock cycle that follows the first clock cycle, the second plurality of bits to the third port on the respective transmission lines.

16. The system of claim 15, wherein the first plurality of bits is 4 bits.

17. The system of claim 13, wherein the switch includes 64 ports.

18. The system of claim 13, further comprising a fabric or network that includes the switch coupled with a plurality of other switches to route data between the plurality of processors.

* * * * *